United States Patent [19]

Davis et al.

[11] Patent Number: 4,700,986
[45] Date of Patent: Oct. 20, 1987

[54] COLLAPSIBLE, PORTABLE TOTE-TABLE

[75] Inventors: Lincoln R. Davis, Lincroft; Louis Flax, Long Branch, both of N.J.

[73] Assignee: LOPAT Enterprises, Inc., Wanmassa, N.J.

[21] Appl. No.: 938,804

[22] Filed: Dec. 8, 1986

[51] Int. Cl.⁴ .............................................. A47B 39/00
[52] U.S. Cl. ...................................... 297/157; 108/64; 312/263; 403/300; 403/341
[58] Field of Search ............... 403/355, 354, 341, 300, 403/305; 108/64; 24/457, 458, 473; 312/263; 297/157

[56] References Cited

U.S. PATENT DOCUMENTS 3,300,245  1/1967  Rumble ................................ 297/157
3,777,432 12/1973  Wyles ............................... 403/341 X
3,874,753  4/1975  Naito et al. ......................... 312/111
4,140,417  2/1979  Danielson ......................... 403/300 X
4,395,080  7/1983  Winn et al. ....................... 312/111 X

FOREIGN PATENT DOCUMENTS 86663 12/1921 Austria .................................. 108/64

*Primary Examiner*—James T. McCall
*Attorney, Agent, or Firm*—Stephen W. White

[57] ABSTRACT

A collapsible, portable tote-table is described. This table can be easily manufactured with a minimum number of parts and, when assembled in a facile manner, is strong, light and completely transportable. The system for the assembly of the aforementioned tote-table can be done by anyone of normal skill and is dominated by a novel dog system for interconnecting the various parts.

4 Claims, 8 Drawing Figures

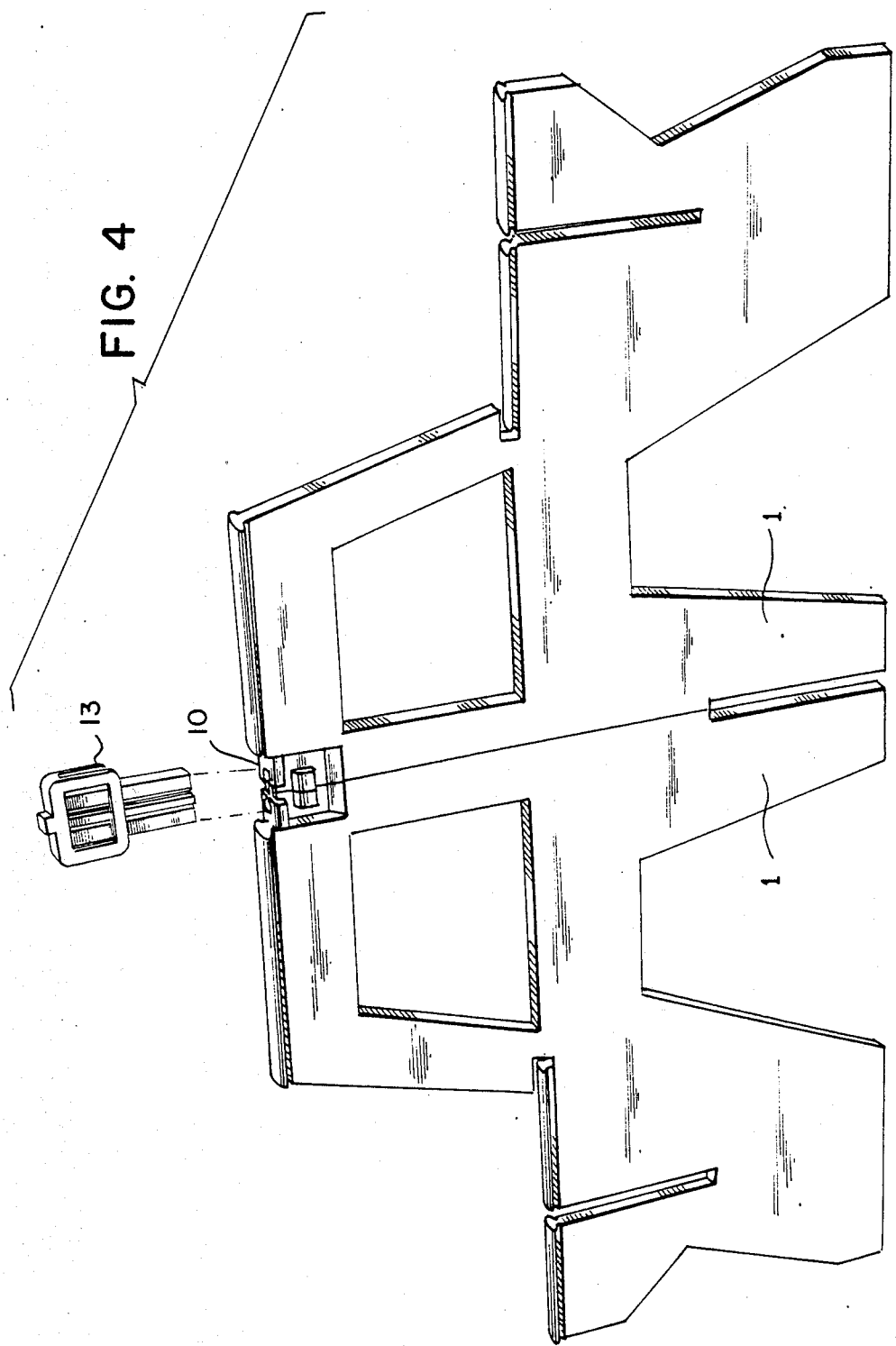

FIG. 6
FIG. 6A
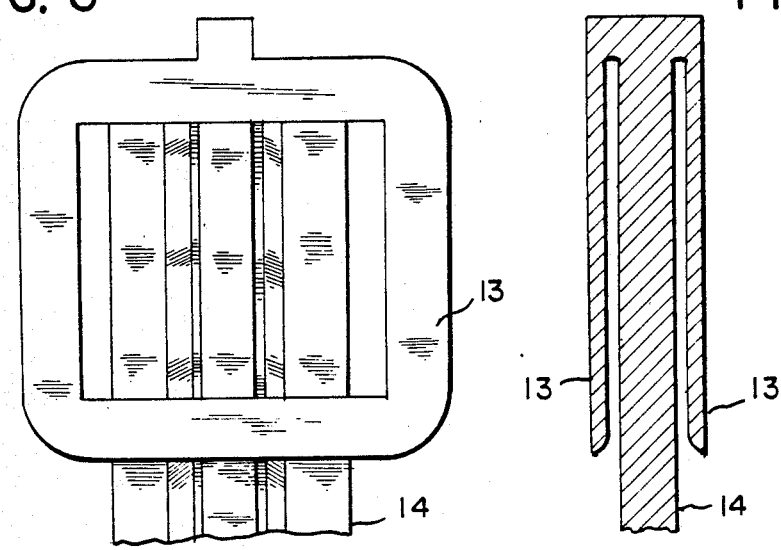
FIG. 5
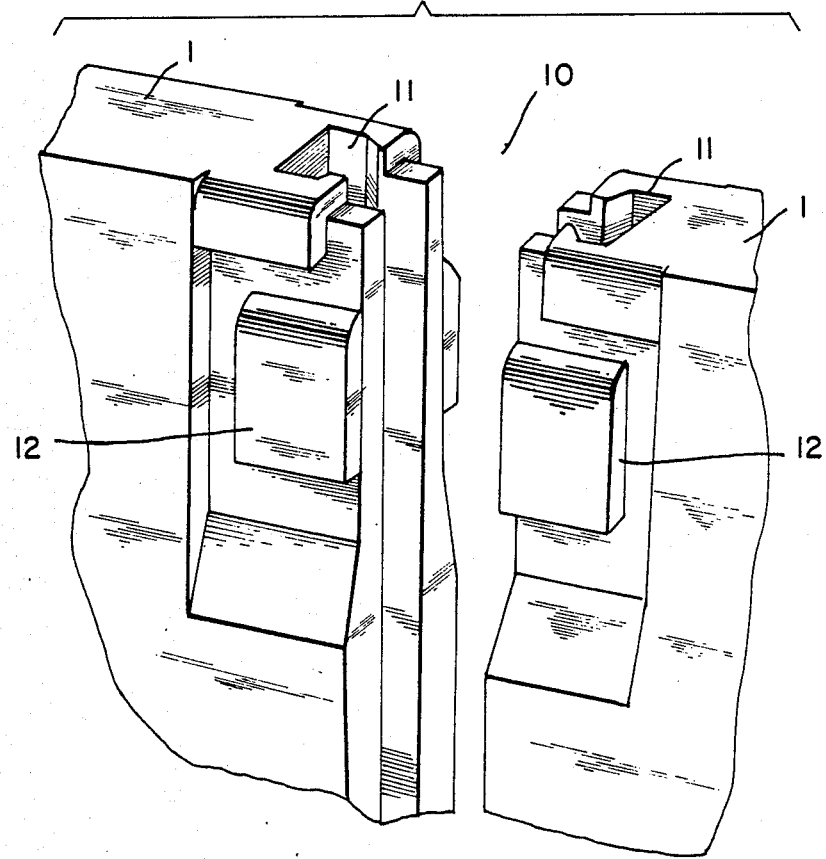

COLLAPSIBLE, PORTABLE TOTE-TABLE

BACKGROUND OF THE INVENTION

1. Field of the Invention

This invention relates to the field of furniture and more specifically to furniture that can be disassembled and assembled to facilitate the portability thereof. Still more specifically, this invention relates to collapsible, portable tables that can be easily manufactured from a host of suitable materials, is assembled from very few parts and is a strong, light weight unit that finds particular uses as a picnic table, for example.

2. Description of the Prior Art

Collapsible, portable tables are well known in the prior art. There are a host of prior art elements described which perform some of the above objects. For example, there are portable tables described in the prior art that can be assembled and disassembled. These, however, have a considerable number of parts required to make up said table and this adds to the manufacturing cost. Additionally, these elements are heavy and cumbersome and there is a question as to their true portability. There are others made from very few parts. These, however, are not as strong as desired and do not function well under heavy use. Thus, there is a pressing need to develop and manufacture a portable table that is easy to manufacture, contains very few parts, is strong, light weight and easy to use. By use herein, we mean the assembly and disassembly of said table. It is understood that a table, fashioned and constructed for use as a table in any way shape or manner is in and by itself utilitarian.

SUMMARY OF THE INVENTION

It is an object of this invention to provide a truly portable, collapsible table which can be made from very few parts that are easily manufactured from light, inexpensive materials. It is also an object of this invention to provide such a portable, collapsible table that can be easily assembled and disassembled and when so assembled is strong and durable. These and yet other objects are achieved by providing a portable, collapsible table having a top and seats, said table being formed by integrating a series of interlocking parts, said parts comprising a plurality of essentially equal dog elements, a plurality of essentially equal grooved plank elements and a plurality of substantially equal upright members, each of said upright members having one vertical edge designed to accept one of said dog elements so that pairs of upright members may be connected by one of said dogs to form legs, and interlocking slots to permit each pair to be connected with each other, wherein after said upright elements are paired and interconnected with each other by said dogs and said slots, an upright pedestal is formed therefrom, and wherein each of said upright members has at least three essentially parallel supporting edges, comprising:

(a) a ground contacting supporting edge;
(b) a seat supporting edge; and,
(c) a top supporting edge, wherein said seat and said top supporting edges are designed so as to mate with said grooved plank elements in a manner such that seats and a top are formed to make up said table.

BRIEF DESCRIPTION OF THE DRAWINGS

FIG. 4 demonstrates how two upright members are placed together with a dog element.

FIG. 5 showing of the edges of two dog elements design to receive a dog element.

FIGS. 6 and 6A show further details of the construction of a dog element.

DETAILS OF THE INVENTION

Figure 1:
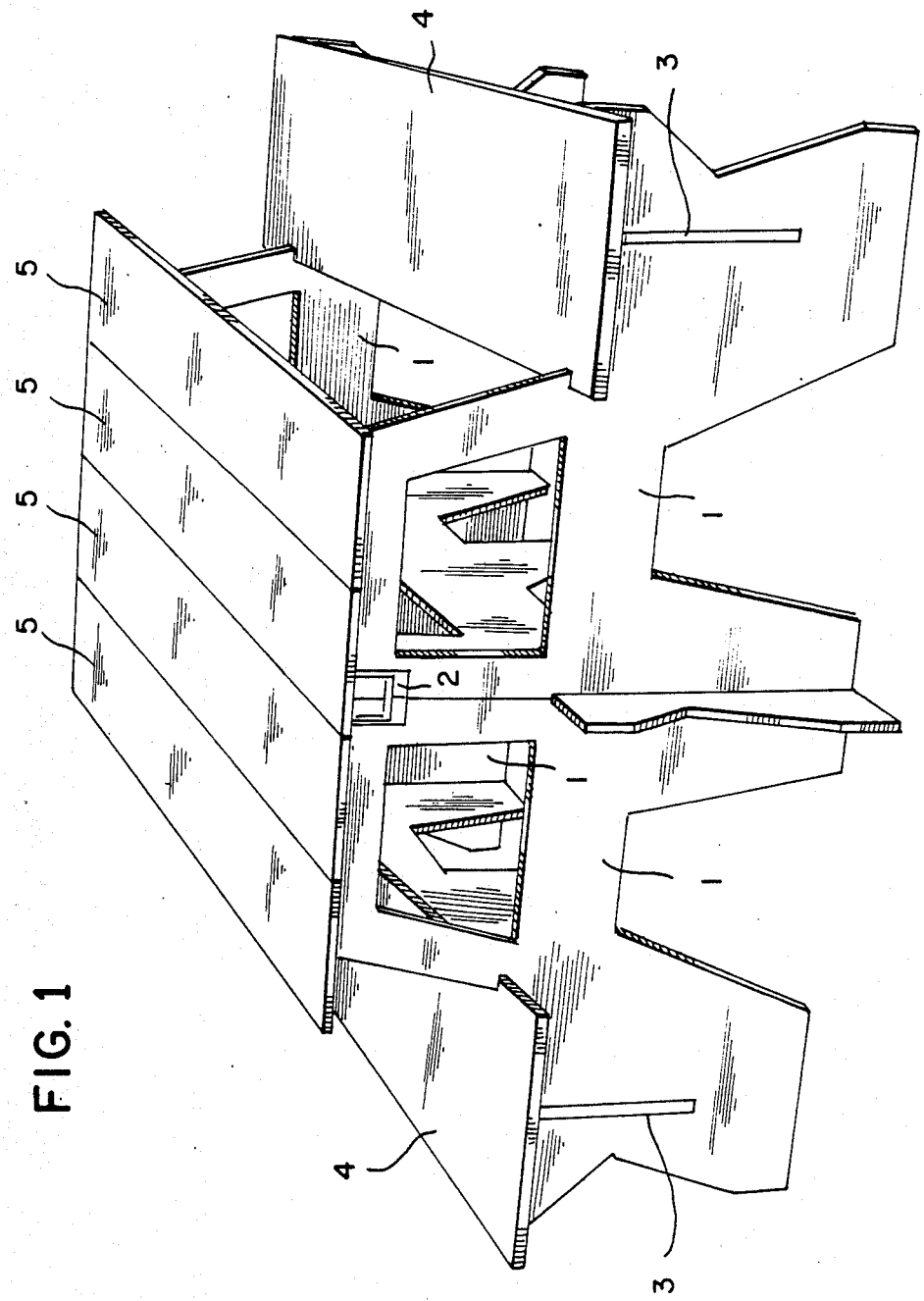
FIG. 1 is an over-view of the assembled table of this invention.

Referring now specifically to the drawings which embody some preferred embodiments and fully demonstrate the utility and novelty of this invention, FIG. 1 is a general over-view of a table made and assembled according to this invention. In this figure (1) are upright members that have been connected by dog elements, one of which is indicated as (2). Since each upright member is made with slots, shown as (3), they are all identical and when three pairs are assembled as shown here, they can be connected generally in the form of an "H" to make the pedestal used to support the seats (4) and the top (5). In this case, the seats and top are formed from grooved plank elements (also identical) and are slidably attached via the grooves (not shown in this drawing) to the respective portions of the pedestal designed to receive these elements. Thus, when the upright members are connected in pairs, pairs further connected to form a pedestal and plank elements slidably attached thereto, the entire unit is strong and stable.

Figure 2:
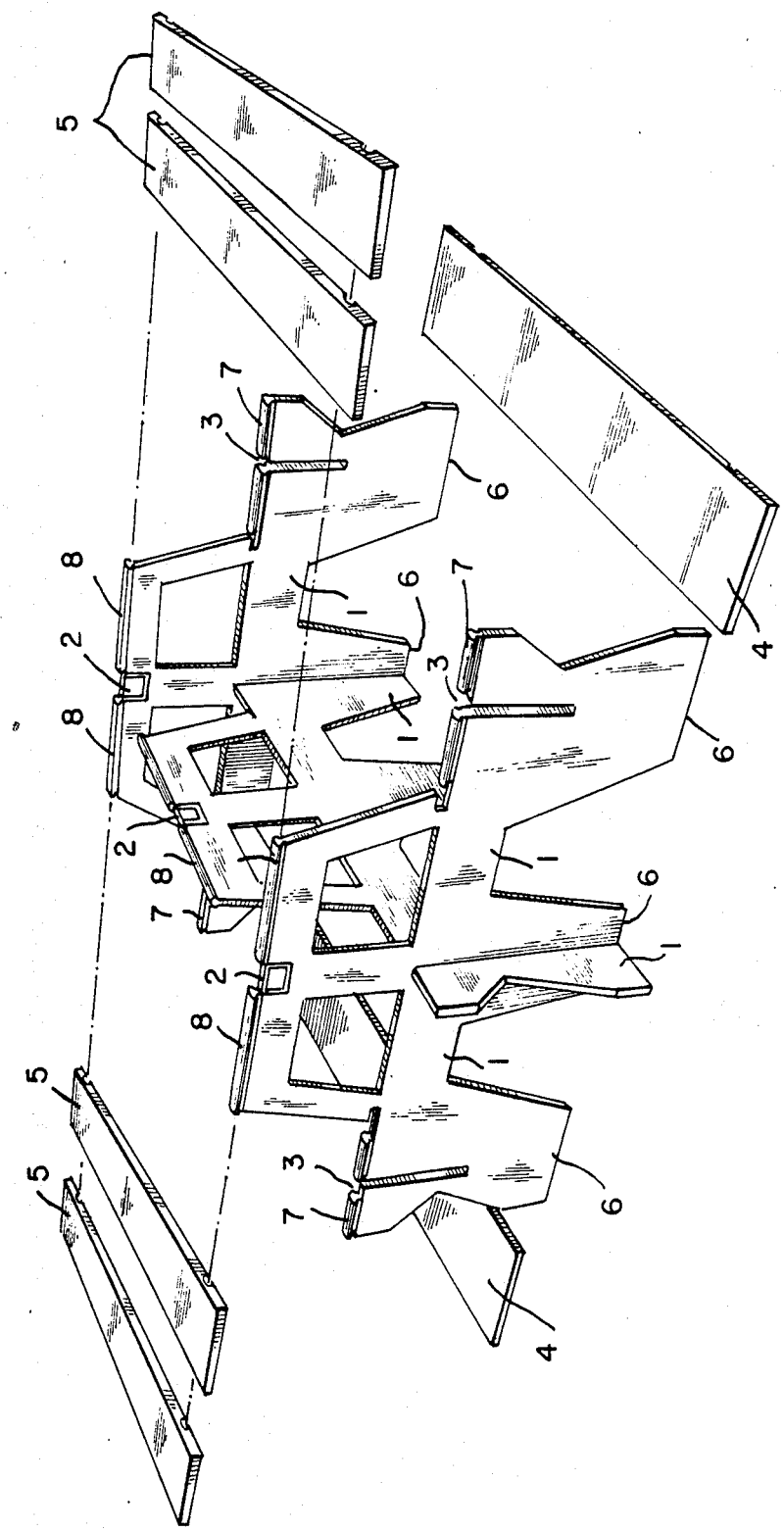
FIG. 2 is a showing from FIG. 1 wherein the top and seat plank elements are removed to demonstrate how the pedestal is formed from upright members.

FIG. 2 is similar to FIG. 1 but with plank elements used to form the seats and top removed to show some further detail. In this showing, it is possible to see upright members (1) connected by dogs (2) in pairs and each pair then assembled via grooves (3) into the pedestal as shown. Each of the upright members has ground contacting edges (6) resting on the ground surface, seat supporting edges (7) and top supporting edges (8). The seat supporting edges and top supporting edges are designed such to mate with the grooves in the planks to be slidably attached thereto. In this particular embodiment, these edges are shown to be rounded to fit within an appropriate rounded grooves in said planks. Thus, the planks are appropriately mated on the respective surfaces by pushing. Other mating systems can also function within the metes and bounds of this invention. For example, the grooves may take a number of different shapes and the edges conform thereto. Additionally, notches may be present in said upright elements into which the plank elements used for the seat may be pushed, in fact it is so preferred.

Figure 3A:
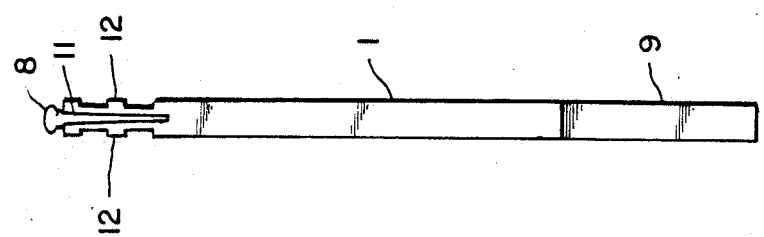
FIGS. 3 and 3A show a front and side view of one of the upright members.
Figure 3:
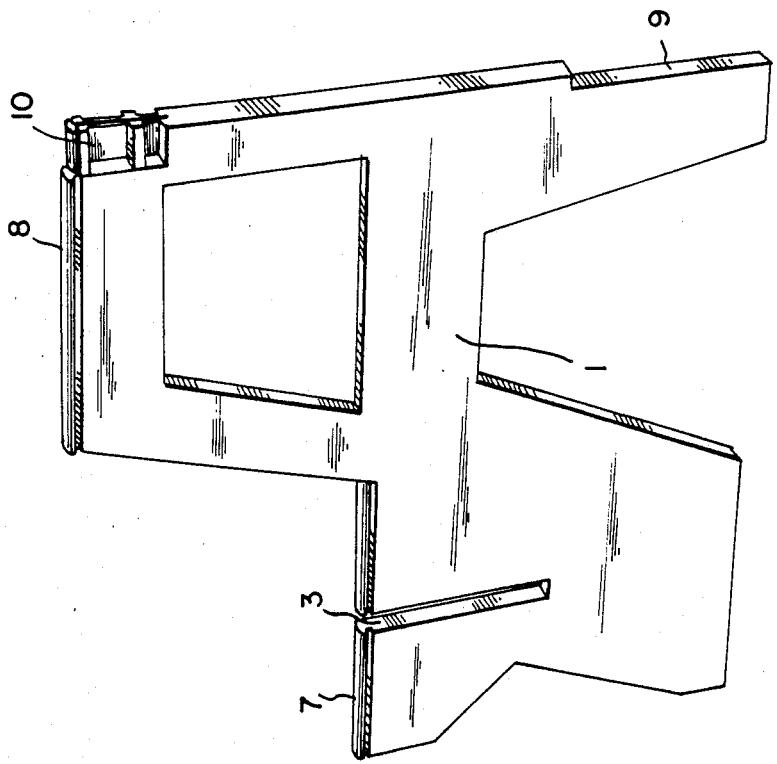

FIG. 3 is a view from the front and the side of a single upright member. In this view, (9) is one half of a slot so that when two members are joined via a dog element placed within the edge designed to accept same (10), the two halves form a complete slot which can be used to join pairs together. In this side view, details of an edge designed to accept a dog is shown. Here, (11) is a slot into which the dog can be inserted, and (12) are a pair of opposing raised portions designed to lock said dog in place.

FIG. 4 shows a pair of upright members placed together to form a part of the pedestal. In this particular view, the dog element (13), which is to be inserted in the slot and locking arrangement shown as (10), shown removed therefrom. Insertion of the dog into the slot will firmly connect the pair of upright members.

FIG. 5 is a detail showing of the slot and locking arrangement used to mate or join a pair of upright members. In this figure, the lock, by which the dog is attached is shown as (12) on each of the upright members (1) and the slot, into which the dog will be inserted, shown as (11). As shown in this figure, this lock is formed by two raised portions (12) on the surface of each of the upright members (1), one on each side of the joint to be formed. Thus, when two members are placed together, to be firmly joined using the dog of this invention (FIG. 6), the lock is completed by engaging the flexible device (13) of the dog element over said raised portions.

FIG. 6 is a detail showing of the novel dog of this invention. In this drawing, (13) is a flexible, raisable release device designed to engage raised portions on the upright members and (14) are opposable inserts designed to fit within the slots on said upright members.

As one can plainly see, the table of this invention, when assembled as shown in the drawings, is connected in such a manner as to form a strong, stable element. When in a disassembled form, there are few parts and thus these can be transported (or toted) in an easy and convenient manner. Each of the individual parts, when disassembled, lies flat adding to the convenience in transport. The unique combination of parts, grooves, slots and the dog element described above, provides an element that is simple and easy to assemble and requires very little skill on the part of the user. This combination, and especially this unique dog element, is not described anywhere in the prior art.

The elements which are used to make the tote table of this invention can be manufactured from any number of convenient materials including woods, plastics, foams such as polyurethanes, etc. Combinations of materials are also possible. These combinations might include wood veneer over polyurethane, for example, lending a decorative touch to a light, structurally strong material. The materials of construction are all well-known in the prior art and are not considered part of the invention as described herein.

As can be seen from the drawings, there are essentially only three elements which are used to assemble a tote table of this invention. The first of these is the upright member. Each of these — and there are six which can be used in combination to make up a table — are identical in shape having three essentially parallel supporting edges which comprise a ground contacting supporting edge, a seat supporting edge and a top supporting edge. In addition, each of these upright members has a vertical edge designed to accept the dog element of this invention. As shown, this vertical edge has a slot and a two raised portions, the slot being designed to accept an insert of said dog and the raised portions designed to accept a locking device also associated with the dog. Slots are also present in order that several pairs of upright members may be interconnected. Thus, when two upright members are placed with said vertical edges in contact, the dog element may be conveniently slid into place, the locking portion being forced over the mated raised portions on both side of the upright members and thus firmly connecting the pair together. When it is necessary to disconnect a pair of upright members, the locking element of the dog, which is flexible, is simply lifted over the raised portions effecting said release and permitting the pair to be disconnected.

Thus, in the preferred embodiment shown in the drawings, six upright members are connected to form three pairs. One pair of these three is then connected to each of the other pair by the slots substantially as shown. This embodiment forms a pedestal in the form of an "H". Planks, of which there can be four or more, and each of which are identical, having grooves therein, are slidably connected to the seat supporting and top supporting edges. In the embodiment shown, there are six of said plank elements, two for the seats and four for the top. Since there are three dogs required to connect the upright members as shown, the total number of parts required is fifteen. However, since each of the upright members, each of the plank elements and each of the dog elements are essentially identical, manufacturing costs are significantly reduced and the convenience of the table greatly enhanced. There is no need for screw, bolts and other connecting parts and thus this tote table is a considerable improvement over the prior art.

The table of this invention may be painted or finished as desired. If wood is used for the material of construction, the surfaces may be painted, in fact it is desirable to do so. Plastics, which are also a preferred material of construction, may be precolored in a variety of different hues as well-known to those skilled in the art. The elements used for constructing the table shown in this invention can be of different shape than those shown. The shape is not essential to the invention. Thus, the edges may be rounded or slanted in a different manner than shown without affecting the essence of the invention. What is shown in the drawings is only the best mode and the most conventional showing for a picnic table, for example. One might substitute a round table top for the rectangular one shown and might substitute several plank elements or even reduce the number. As long as the basic elements of the invention and the connecting mechanisms shown and described are present, the essence of the invention is followed.

We claim:

1. A portable, collapsible table having a top and seats, said table being formed by integrating a series of interlocking parts, said parts comprising three essentially equal dog elements, six essentially equal grooved plank elements and six essentially equal upright members, each of said upright members having one vertical edge designed to accept one of said dog elements so that pairs of upright members may be connected by one of said dog elements to form legs, and interlocking slots to permit each pair to be connected to each other, wherein after said upright elements are paired and interconnected with each other by said dogs and said slots, an upright pedestal is formed therefrom, and wherein each of said upright members has at least three essentially parallel supporting edges comprising:

(a) a ground contacting supporting edge;
 (b) a seat supporting edge; and,
 (c) a top supporting edge, wherein said seat and said top supporting edges are designed so as to mate with said grooved plank elements in a manner such that seats and a top are formed to make up said table.

2. The table of claim 1 wherein said elements are made from the group consisting of wood, plastic, metal, polyurethane foam and combinations thereof.

3. A dog element suitable for connecting two parts and being easily removed therefrom, wherein said parts have slots and substantially equal raised locking portions, and wherein said dog comprises a stem, a pair of opposing inserts designed to fit into said slots in said parts thereby firmly connecting said parts, and a pair of opposing release devices designed to hook over said raised locking portions, said release devices being flexible so as to provide springing actions thus insuring that said dog remains within said slots without disengaging therefrom prior to lifting on said release device.

4. A process of assembling the portable, collapsible table of claim 1 comprising the steps of:
 a. Inter-locking three pairs of upright members with dog elements to form three legs;
 b. Inter-connecting each of said legs to form a pedestal substantially in the form of an "H";
 c. Mating grooved planks on seat supporting edges to form a pair of seats;
 d. Mating at least four grooved planks 1 on top supporting edges to form a top;
whereby a strong, light and useful table is formed.

* * * * *